Sept. 8, 1936.  T. H. WILSON  2,053,307
MACHINE FOR COATING PIPES
Filed Sept. 6, 1932   6 Sheets-Sheet 1
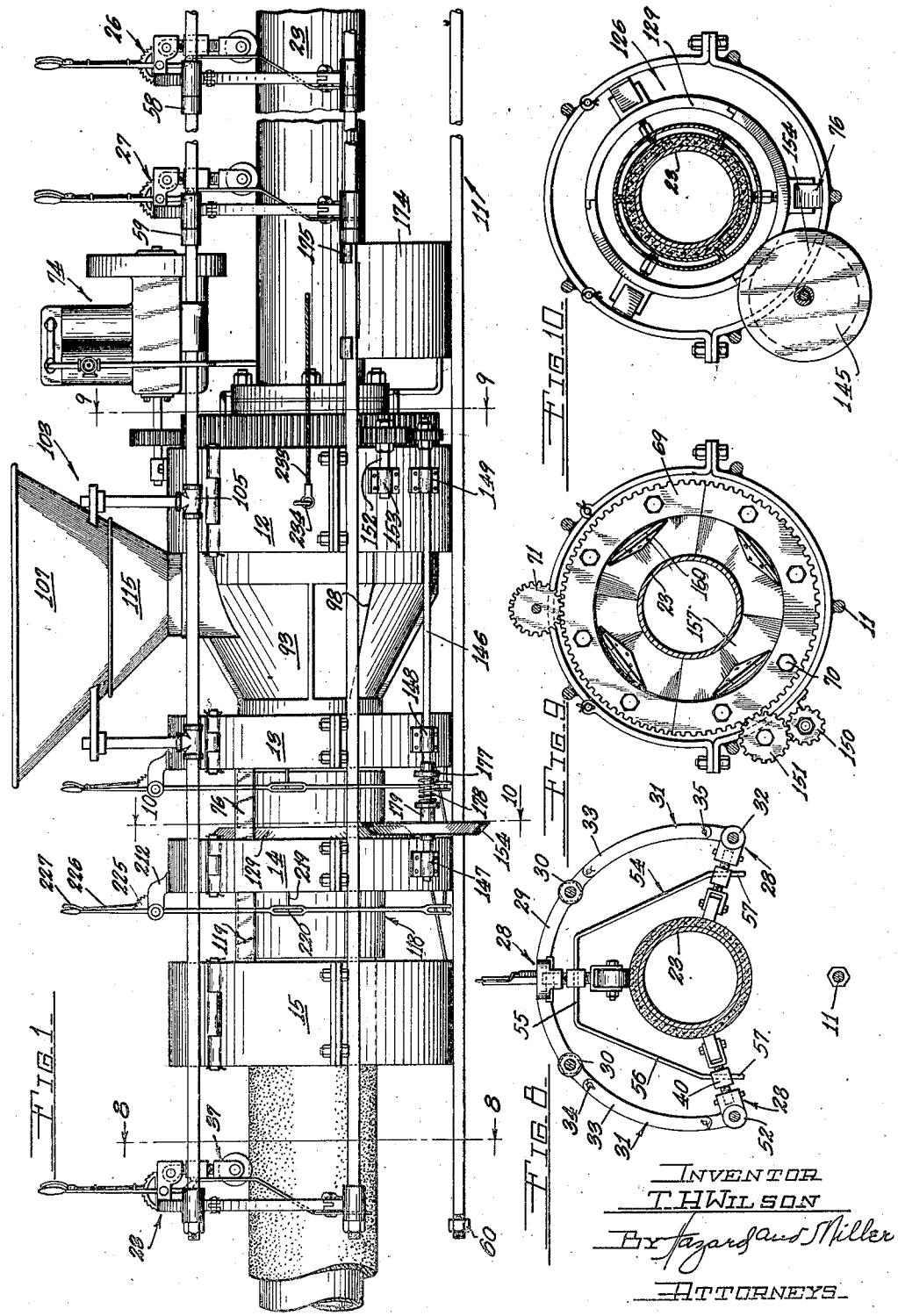
INVENTOR
T. H. WILSON
By Hazard and Miller
ATTORNEYS Sept. 8, 1936.   T. H. WILSON   2,053,307
MACHINE FOR COATING PIPES
Filed Sept. 6, 1932   6 Sheets-Sheet 2
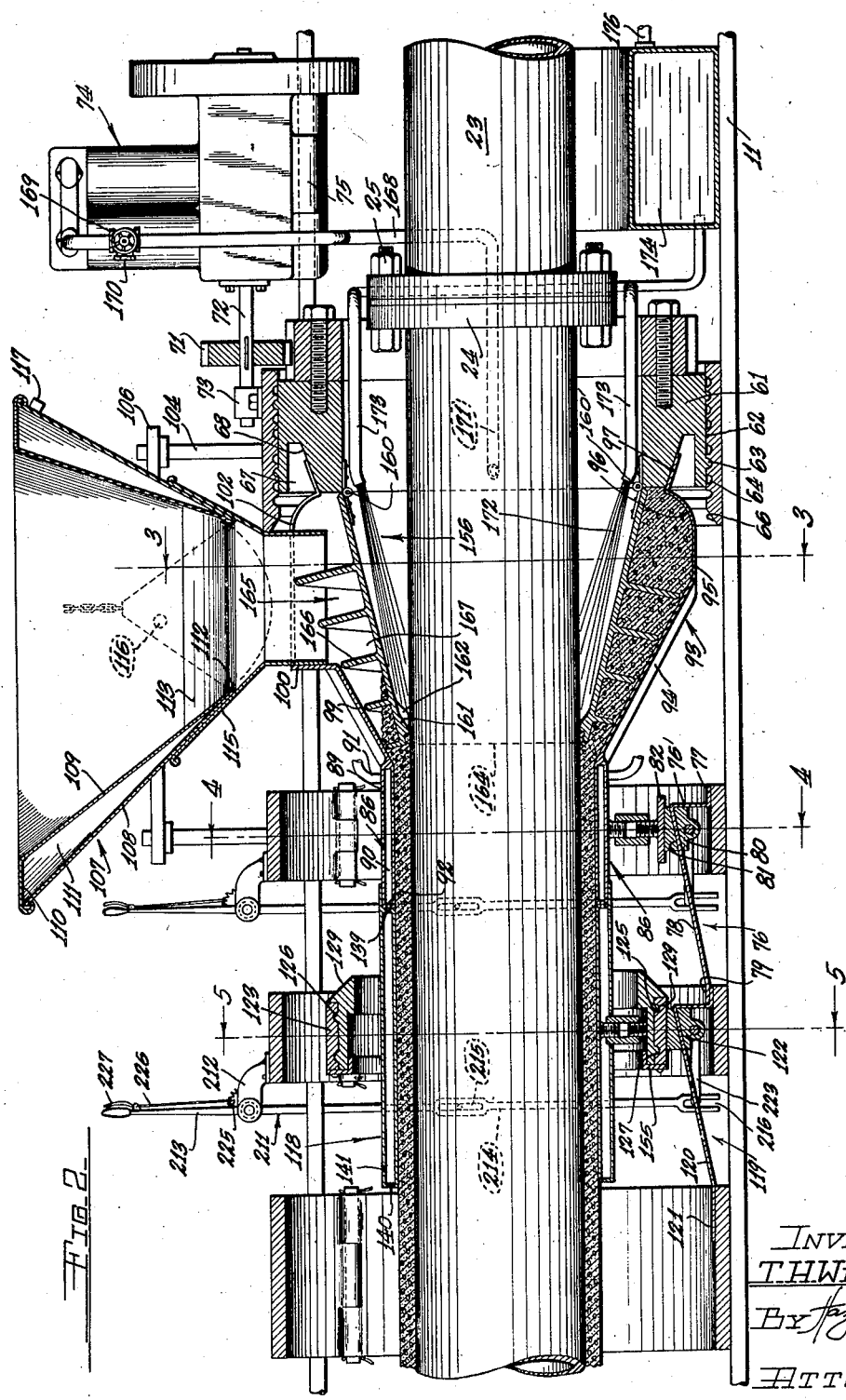
INVENTOR
T.H.WILSON
By Fayers and Miller
ATTORNEYS Sept. 8, 1936. T. H. WILSON 2,053,307
MACHINE FOR COATING PIPES
Filed Sept. 6, 1932 6 Sheets-Sheet 3
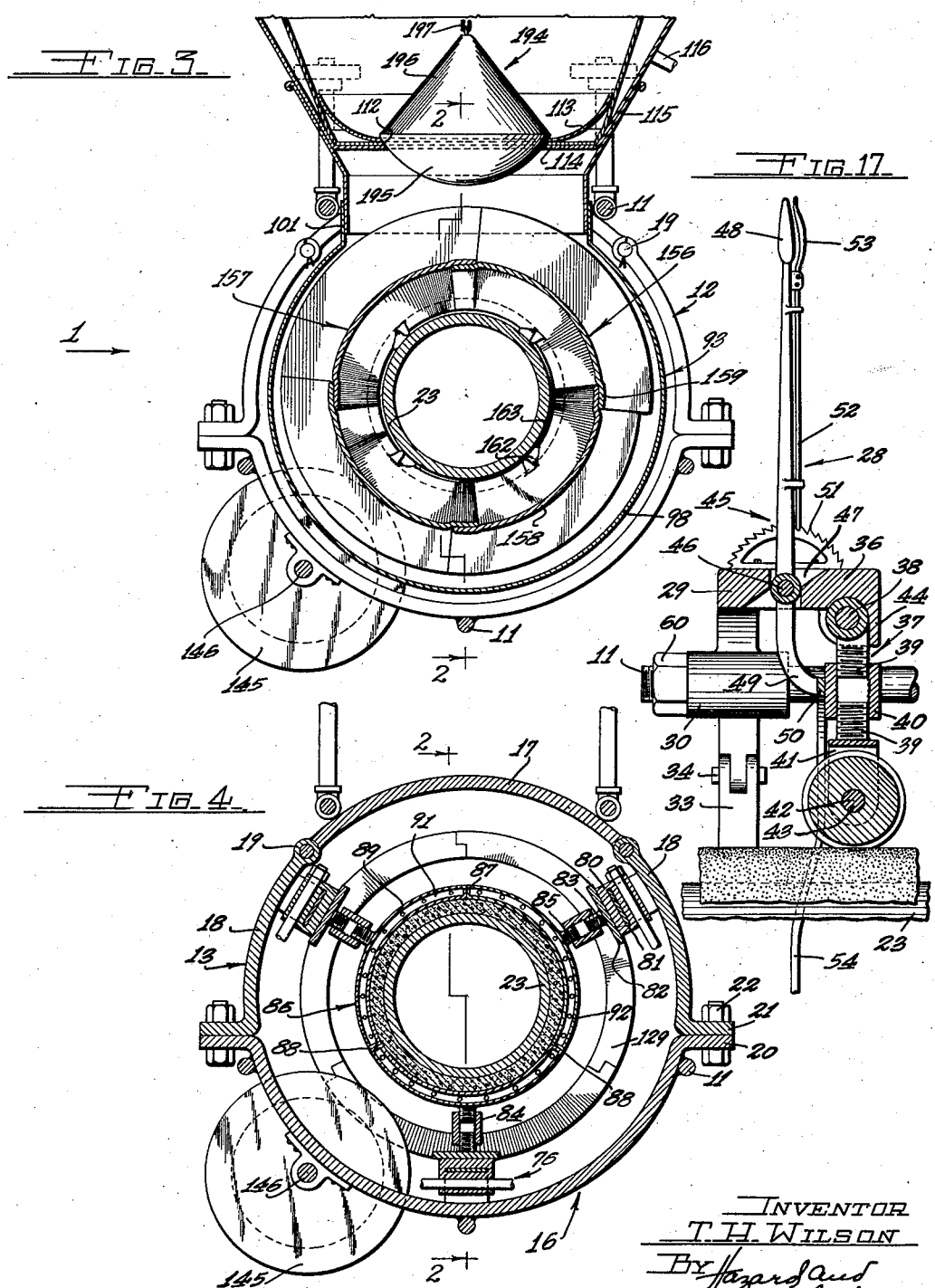
INVENTOR
T. H. WILSON
By Hazard and Miller
ATTORNEYS

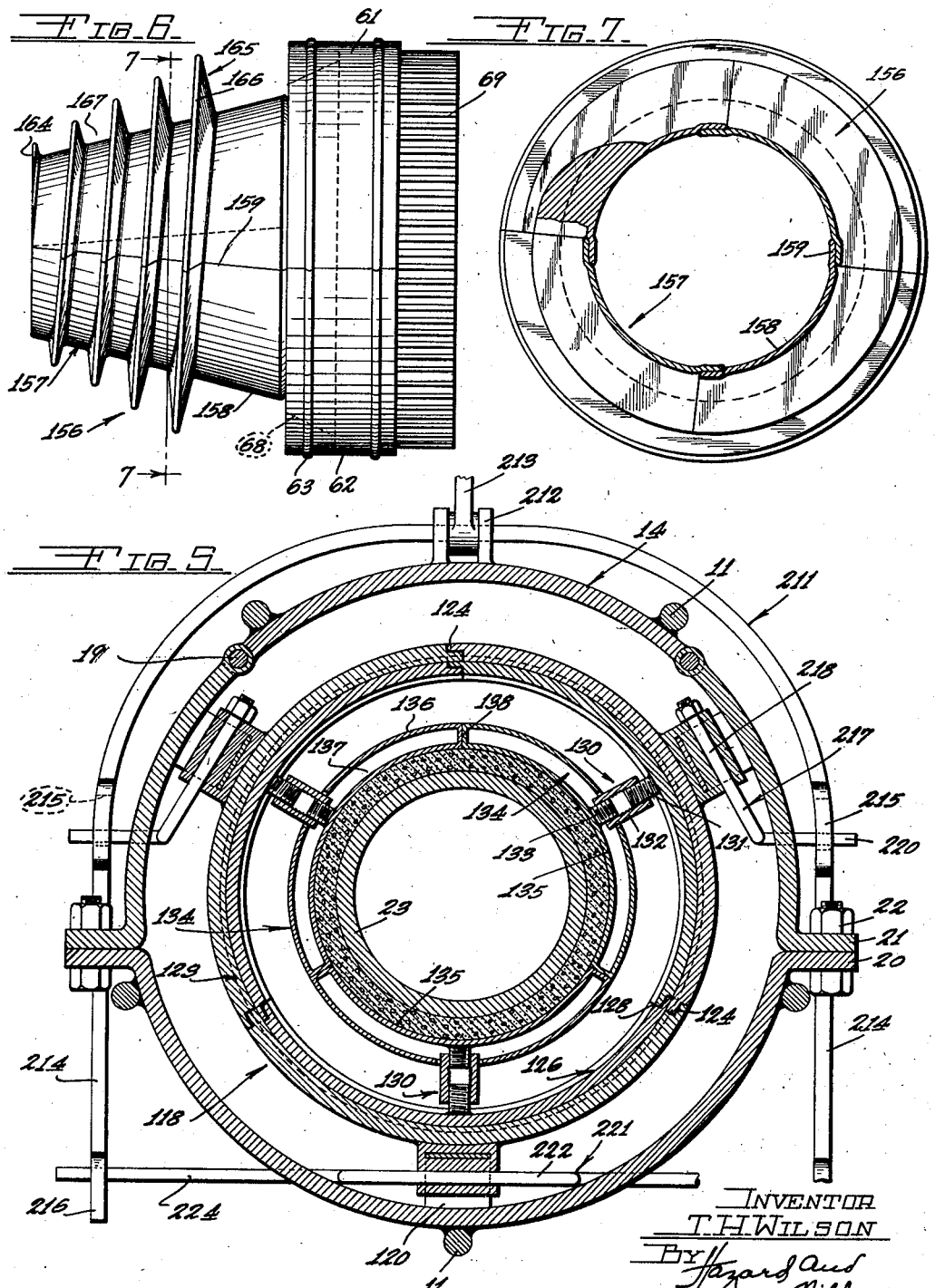

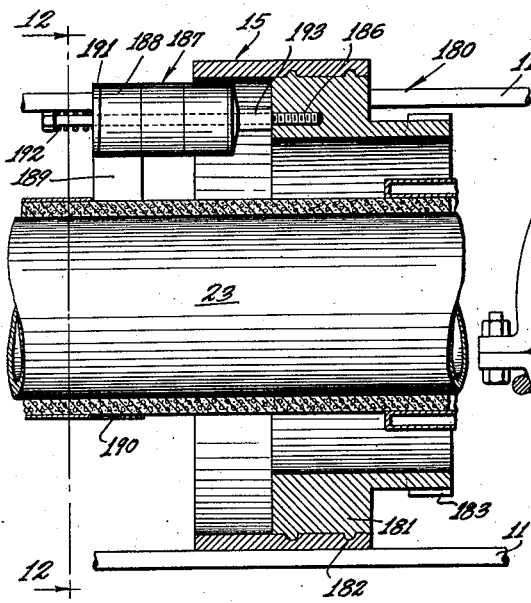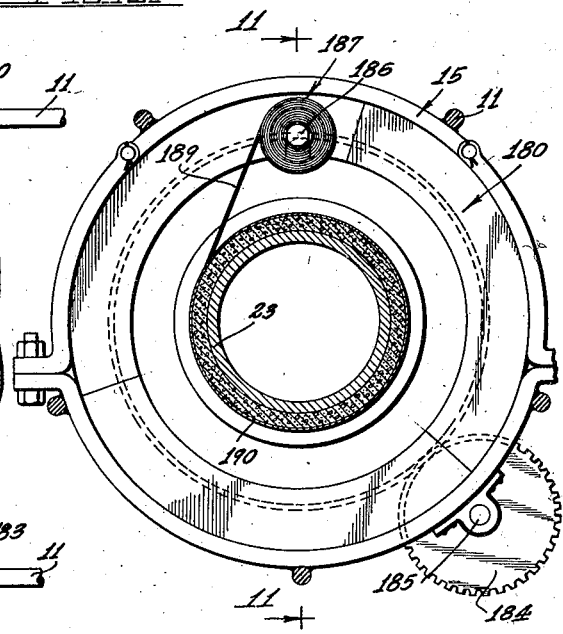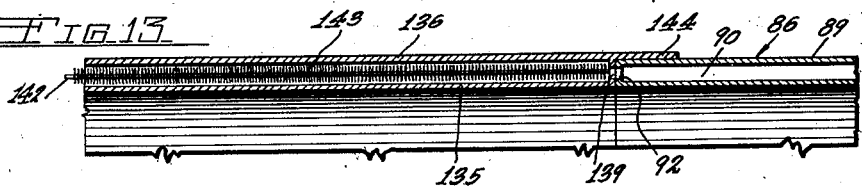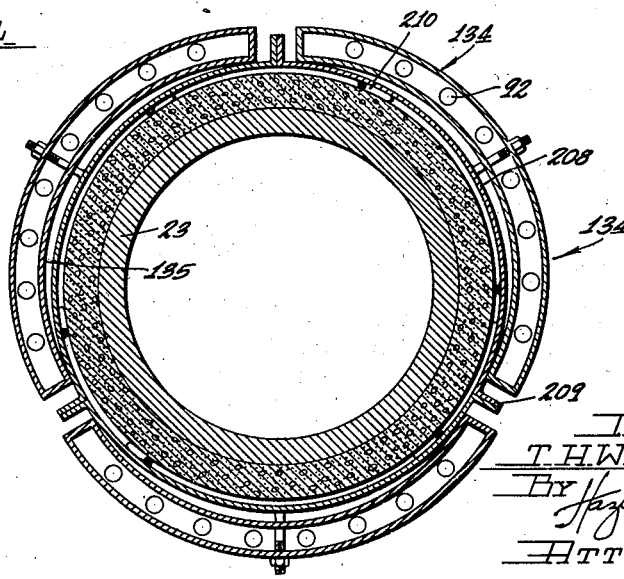

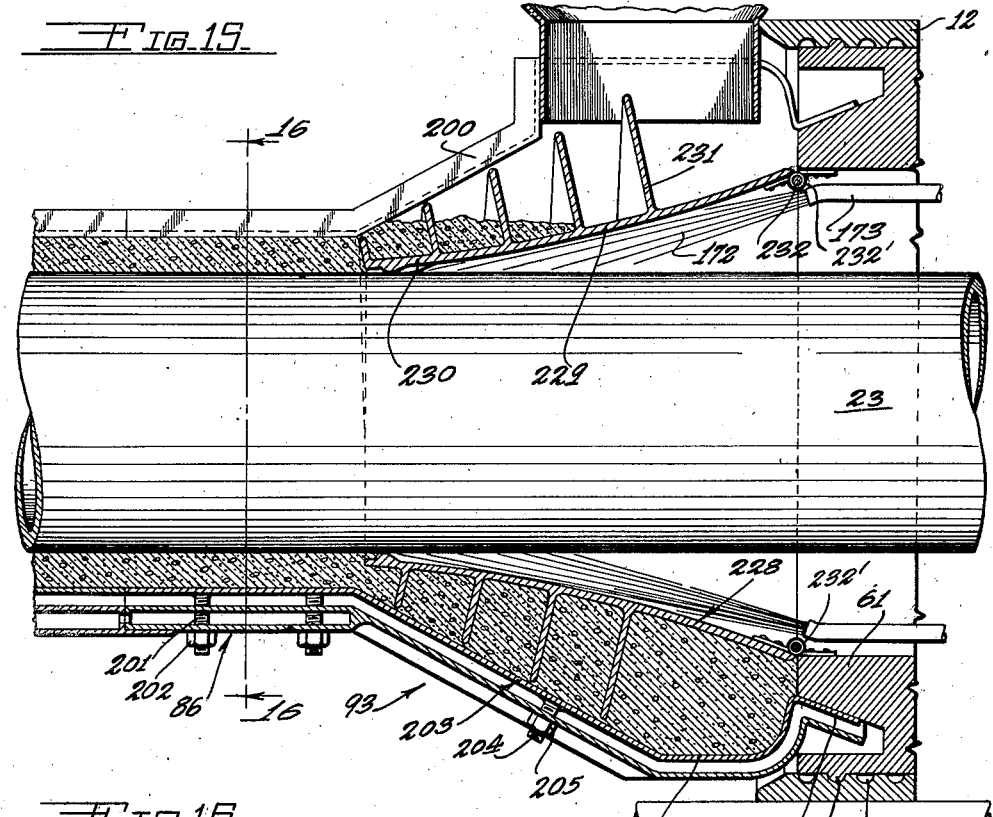

Patented Sept. 8, 1936

2,053,307

UNITED STATES PATENT OFFICE 2,053,307

MACHINE FOR COATING PIPES

Thomas H. Wilson, Los Angeles, Calif., assignor, by direct and mesne assignments, of twenty per cent to Thomas H. Wilson, ten per cent to Frank A. Nance, twenty per cent to Mrs. Edith L. Chamberlain, and fifty per cent to S. C. Lines Application September 6, 1932, Serial No. 631,760

35 Claims. (Cl. 25—38)

My invention relates to a machine and method of coating pipes with a plastic composition, preferably of a type in which the machine progresses continuously along a length of pipe, laying the coating or covering on the pipe during the continuous and forward movement of the machine.

In this type of machine and method, one of the main objects and features of my invention is depositing a plastic and self-hardening composition on a pipe by means of an Archimedean feeding screw which rotates around the stationary pipe, the screw receiving the coating material, preferably from a hopper. This screw is designed and operated to force the material in a longitudinal direction as to the pipe and compact the material in an annular space between the stationary pipe and the stationary sleeve-like mold.

Another feature of my invention in this regard is that the feeding and compacting of the material exerts a force for moving the coating machine longitudinally of the pipe, the machine being advanced as fast as the pipe is coated.

Another feature of my invention as regards the machine is constructing and mounting this on dollies which operate at the feeding end on the pipe and on the completed end on the coating or layer. This gives a support to the machine so that it may be moved longitudinally as the operation of the covering proceeds.

Another feature of my invention relates to constructing and mounting the dollies so that they may be retracted for lifting over flanges or the like on the pipe and also to accommodate different diameter pipes within certain limits and increased or decreased thicknesses of coating on the pipe.

Another detailed feature of my invention as it relates to the machine is a construction of the feeding screw by which this may be expanded or contracted to ride over the flanges forming couplings of a pipe. To effect this the screw is formed somewhat in a conical shape with the base toward the uncoated pipe and the apex facing the coated portion. The screw is, preferably, made in segments hinged at the large end on hinges transverse to the axis of the pipe to allow the contracted end of the conical screw to tilt outwardly.

Another detailed feature of my invention in regard to the enlargement of the screw provides for a longitudinal movement of such screw in reference to the hopper and to the outside mold or sleeve between which and the pipe the material is forced into a compact annular covering.

Another detailed feature of my invention in regard to the coating of the pipe comprises a provision for subjecting the pipe to a blast of hot air for drying its exterior and then, if desired, in addition, a means for applying a priming coat to form an adhering body to the pipe prior to the application of the coating layer.

A further object and feature of my invention is subjecting the coating to, in effect, a troweling or ironing action after being deposited, this being by means of a rotating polishing sleeve which rotates in, preferably, an opposite direction to that of the screw which deposits the coating. This has the effect, when a concrete mixture is deposited on the pipe, of bringing the water to the surface and smoothing the finished concrete and, if a composition has a mastic, such as an asphalt, oil or tar mixture, of smoothing this and giving a surface finish.

For the purpose of maintaining the proper condition of the material I provide a hopper means for applying heat thereto for hot material applications; the molding sleeve is provided with means for cooling or heating the coating as deposited depending on the type of material. A hot coating is preferably cooled, whereas concrete may be heated to evaporate some of the moisture. The polishing and surface finishing rotatable sleeve may be either heated or cooled in accordance with the nature of the coating.

Another feature of my invention comprises actuating the depositing screw by means of an engine carried by the framework of the machine and also using the power from the engine to rotate the polishing sleeve.

In brief, in the construction of my machine, I utilize a plurality of longitudinal rods which are secured to segmental rings, these segments being attached together at separable flanges. The longitudinal rods are spaced around the rings and are thus concentric to the pipe to be coated. The rings have pivoted gate sections so that they can be fitted over a pipe by opening the gates instead of having to unclamp the rings. The dollies are mounted on a sufficient number of rods to afford a proper support and a centering for the frame of the machine on the pipe to be coated and on the finished coating. Preferably two sets of dollies are used on the pipe and one set on the coating. These dollies, as above mentioned, may have the wheels arranged to tilt to ride over a flange and may be thrust forward over a flange and again grip the pipe.

One of the segmental rings carries an outside conical chamber to which is fitted the hopper, and at the termination of this chamber at the apex another segmental ring holds the throat sleeve section of the mold. The cone-shaped screw rotates in the conical chamber and receives the material from the hopper, thrusting this into the throat mold. For the purpose of rotating the conical screw this is secured to a rotatable segmental ring which has a gear attached thereto and is driven by a gear drive from an engine supported on the frame of the machine. The polishing or surface finishing devices comprise a tubular structure formed in longitudinal segments which is adjustably held in one of the segmental rings and bears with a light pressure on the outside of the coating. Through means of a drive connection this is rotated and preferably in an opposite direction to that of the feeding and compacting screw in order to give a reverse torque. The throat and the polishing or troweling tube both have their segments radially adjustable to accommodate different thicknesses of coating. This adjustability also provides for a quick enlarging of these elements to pass a flange on a pipe. The machine is not intended to coat the pipe completely to the flange but the coating at the flange is applied subsequently.

My invention is illustrated in the accompanying drawings, in which:

Fig. 1 is a side elevation taken in the direction of the arrow 1 of Fig. 3.

Fig. 2 is a vertical longitudinal section taken on the line 2—2 of Fig. 3 or 4 in the direction of the arrows, with the pipe and engine shown in elevation.

Fig. 3 is a vertical transverse section on the line 3—3 of Fig. 2 in the direction of the arrows.

Fig. 4 is a vertical transverse section on the line 4—4 of Fig. 2 in the direction of the arrows.

Fig. 5 is a vertical transverse section on the line 5—5 of Fig. 2 in the direction of the arrows.

Fig. 6 is a side elevation of the conical material feeding screw, the segmental ring to which it is secured, and the drive gear.

Fig. 7 is a vertical transverse section of the screw on the line 7—7 of Fig. 6 in the direction of the arrows.

Fig. 8 is a vertical transverse section on the line 8—8 of Fig. 1 in the direction of the arrows.

Fig. 9 is a vertical transverse section on the line 9—9 of Fig. 1 in the direction of the arrows.

Fig. 10 is a vertical transverse section on the line 10—10 of Fig. 1 in the direction of the arrows.

Fig. 11 is a vertical longitudinal section of an attachment to the coating machine for applying a wrapping outside of the coating, taken on the line 11—11 of Fig. 12 in the direction of the arrows.

Fig. 12 is a vertical transverse section on the line 12—12 of Fig. 11 in the direction of the arrows.

Fig. 13 is an enlarged partial longitudinal section through the polishing or troweling tube or sleeve, showing a heat disseminating ring.

Fig. 14 is a vertical transverse section through the polishing or troweling sleeve or tube, showing this expanded and with liners inserted for different thicknesses of coating or for coating different diameter pipe.

Fig. 15 is a longitudinal section enlarged similar to part of Fig. 2 showing a modified form of a feeding screw and with fillers for expansion of the molding throat or collar and molding form on which the screw operates.

Fig. 16 is a transverse section on the lines 16—16 of Fig. 15 in the direction of the arrows.

Fig. 17 is a vertical section through one of the dolly carriages, showing the detail construction.

Fig. 18 is a partial longitudinal section showing a nonadjustable material feeding screw.

The frame of the machine utilizes a plurality of longitudinal rods 11, there being five illustrated. These are connected to a first journal ring 12, a second ring 13, a third ring 14, and a fourth ring 15. Each of these rings is formed with a lower segment 16 (note Fig. 4) and an upper segment 17. The upper segment has a pair of lateral gates 18 pivoted at 19. The lower section is provided with flanges 20 on opposite sides and the lower ends of the gates with flanges 21 at their lower edge, and bolts 22 extend through these flanges. The rods are welded to the sections of each ring, thus making a rigid structure.

The means to support the rings on the pipe is as follows:

The pipe to be coated is designated by the numeral 23. This is illustrated as having a flanged coupling 24 secured by bolts 25, this being a common type of joint. A first dolly carriage 26 and a second dolly carriage 27 are mounted on the rods 11 at the end toward the uncoated pipe, and a third dolly carriage 28 on the end of the rods surrounding the coated section of the pipe. Each of these dolly carriages is of similar construction and is provided with a top segment 29 having two hubs 30, the hubs being slidable on the two upper rods, two side segments 31 each having a lower hub 32 slidable on the two lower side rods. The bottom rod does not have any connection with the dolly carriages. Each of the segments of the dolly carriage has a pivoted gate 33 illustrated as hinged at 34 and secured by bolts or the like 35. (Note Figs. 1, 8, 17.) Extending laterally from the center portion of the segment 29 there is a center bracket 36, to which is pivoted a stem 37, the pivot being 38. Each stem is formed of two screw threaded sections 39, these being left and right hand threads and with a turnbuckle or nut coupling 40, this being to adjust the length of the stem. The inner end of each stem is provided with a yoke 41 in which is journaled the dolly wheels 42 mounted on the axle 43 (note details of Fig. 17). The bracket 36 is provided with a depending limit stop end 44, which prevents the stems of the dolly and the wheels from swinging too far forward toward the uncoated section of the pipe.

These dolly wheels and their stems are held in a radial position as regards the pipe by means of a lever 45. This is pivoted at 46 and passes through a slot 47 in the bracket 36. The upper end of the lever has a hand grip 48 and the lower end 49 is curved and has a shoe 50 which bears against the nut or turnbuckle 40. A ratchet segment 51 is engaged by a sliding pawl 52 mounted on the handle section of the lever having a finger grip end 53. A pressure is exerted on the stems of the two lower dolly wheels by means of extension arms 54 extending from the shoe 50. These have a horizontal section 55 and two lateral sections 56 extending downwardly on opposite sides of the pipe (note Fig. 8) and are provided with shoe ends 57 to engage against the two turnbuckles of the two lower dolly stems.

The manner of operating the dolly carriages is as follows:

The rods 11 are provided with stop shoulders 58 for the dolly carriage 26 and 59 for the dolly carriage 27 and with stop nuts 60 for the carriage 28. When the wheels of the carriage 26 contact a flange, such as the flange 24, the pawl is released from the ratchet segment 51 and the lever 45 is actuated by swinging the hand grip end forwardly. This releases the shoes from the stems carrying the turnbuckle wheels and allows the stems to tilt so that the forward dolly carriage 26 may be manually shifted over the flange, this being moved away from the stop 58. The hand lever 45 is then actuated to bring the shoes into contact with the dolly wheel stems and thrust these stems into a radial position, again bringing this first set of dolly wheels into engagement with the pipe on the forward side of the flange. When the machine is advanced so that the wheels of the dolly carriage 27 contact with the flange, the same procedure is followed, and a similar procedure is followed in connection with the wheels of the dolly carriage 28 to pass this over the flange.

The rotating molding part of the machine comprises a heavy segmental rotatable ring 61 (note Fig. 2). This is provided with a cylindrical outer surface 62 with annular ribs 63 which fit into annular grooves 64 in the first ring 12. This ring 12 has an internal bevel 66 at its rearward edge. The rotatable ring 61 is provided with an annular recess 67 at one end having a sloping surface 68. A segmental gear 69 (note Fig. 9) is secured to the rotating ring 61 by means of bolts 70. This ring is rotated by means of a drive pinion 71 mounted on the drive shaft 72, this shaft having its rear end mounted in a journal 73 on the top of the journal ring 12. The shaft is actuated by an engine 74 indicated preferably as an internal combustion engine, which engine is mounted on a base 75 on the two upper rods 11. The gear 69 has a wide face for a purpose hereinunder detailed.

The second ring 13 is provided with three sloping guide tracks 76 (note Figs. 2, 4, 10). Each of these guide tracks has a radial section 76' and a flange 77, the flange being secured to the inside of the ring 13 adjacent its forward portion. There is a sloping section 78, and the end 79 is secured to the third ring 14 on the inside. Slidably mounted on the sloping section 78 there is a shoe 80 having a slot 81 therethrough.

Secured to each shoe there is a small metal plate 82 and this has a threaded stud 83 engaging a turnbuckle 84. In the opposite end of the turnbuckle is threaded a complementary screw 85. The two screws 83 and 85 with the connecting turnbuckle form a radially adjustable strut. The inner end of the strut carries the segments of the molding collar 86. This molding collar is shown as having a vertical joint 87 and two lateral and lower joints 88. The collar is formed with an outer wall 89, thereby having a hollow space 90. Into this hollow space leads a pipe 91 and at the end of the space there are a series of perforations 92, this being for the circulation of hot or cold air or hot or cold liquid, as desired.

Formed integral with each of the segments 86 there is an expanded molding form 93 having strengthening ribs 94. This expands outwardly in a conical manner and is provided with a short, substantially cylindrical section 95 and an inwardly curved portion 96 and a sloping flange 97 riding on the surface 68 of the rotatable ring 61. The molding form 93 is provided with longitudinal splits 98 on the side, these being in alignment with the lower joints 88 of the collar 86 and a central joint 87 at the top. The upper portion of the molding structure 93 is provided with a vertical curved flange 100 at the front engaging with side flanges 101, and there is an open slot 102 at the rear portion.

A hopper assembly 103 (note Fig. 1) has short posts 104 secured to T-shaped connections 105 which are fitted on the two upper rails 11. Brackets 106 hold the hopper 107 in position. This hopper is made with an outer shell 108, an inner shell 109, and a closure top 110, leaving a hollow space 111. These shells taper to a circular throat 112 at the bottom. At the sides it is necessary to have curved plates 113 leading to the throat above the horizontal plates 114 formed where the inner and outer shells join at the bottom and sides. The main hopper fits in a lower loose-fitting hopper 115, this latter hopper extending downwardly through the slot 102 and fitting against the flanges 101. In order to establish a circulation of either hot or cold air or water in the hollow space 111 between the inner and outer shells of the hopper, I provide pipes 116 and 117.

The surface finishing or troweling assembly is designated by the numeral 118. This employs three guide structures 119, each having a sloping section 120 secured at the outside end 121 to the inside of the ring 15. These are the same shape as the sloping guides 76 and are secured to the ring 14 at the high end. A shoe 122 is fitted on the sloping part of each guide, this shoe being the same as the shoe 80 and having a slot therethrough. Each shoe is provided with an outer bearing ring 123 (note Figs. 2 and 5). These have a staggered joint 124. They are provided with a plurality of grooves 125. In this outer bearing ring there is mounted a rotatable segmental ring 126. This ring has annular ribs 127 which fit in the grooves 125. It is provided with overlapping joints 128 and has a cone-shaped friction surface 129, the joints cutting this surface.

Attached to the segmental ring 126 there are radial studs 130 which have a screw threaded section 131 secured directly to each segment of the ring, a turnbuckle nut 132, and a screw 133 secured to the polishing segments 134. These segments are illustrated as having an inner skin 135 and an outer skin 136, forming a hollow space 137 therebetween. These sections have radial joints 138 extending longitudinally. They are provided with perforations 139 communicating with the perforations 92 and have small outlet perforations 140 at the end or 141 through the outer skin. This hollow structure is to provide for the flow of either hot or cold air for either heating or cooling the polishing segments. To effect a better transfer of heat the hollow space 137 may be provided with rods 142 having fins 143 thereon, as shown in Fig. 13. The outer skin has a forward projection 144 which extends over the outside of the outer portion of the molding collar 86.

The means for rotating the polishing segments is through the medium of the driving friction wheel 145 (note Figs. 1, 3, and 4). This is secured to a longitudinal shaft 146 mounted in journals 147 on the ring 14, 148 on the ring 13, and 149 on the ring 12. The shaft is driven through the medium of a drive pinion 150 on the shaft operated by an idler pinion 151 on a stub shaft 152 secured by a bracket 153 to the ring 12, the idler pinion meshing with the gear 69 (note Fig. 9). The friction wheel 145 has a beveled face 154 bearing against the bevel 129 of the segmental ring 126. In order to additionally secure the ring 123 in place angles 155 are secured to the ring 123. The ring 126 and, hence, the polishing segments, are rotated in an opposite direction to that of the gear 69 and rotating ring 61.

The means for feeding and compacting the covering material for the pipe comprises a somewhat cone-shaped screw 156. (Note Figs. 2, 3, 6, and 7.) This screw is formed with segments 157. Each segment has a curved section 158. These sections have a slipping overlap joint 159 and each section at its large end has a hinged connection 160 to the rotatable ring 61. At the contracted end of these segments, each of these is provided with a short rubbing shoe 161, these shoes having a taper as illustrated at 162 (note Fig. 3) and contacting with the pipe, leaving a small annular space 163 between the inner portions of the conical segments and the pipe. These conical segments terminate at their apex, the circular line 164 (note Fig. 2). The screw 165 has a thread 166. This is preferably of constant pitch but the thread is of greater height at the enlarged portions of the cone structure than at the apex or smaller portion. This provides a series of pockets 167 which decrease in size between the segments 158 and the molding structure 93, thus aiding the compacting of material before it enters the molding collar 86.

In order to dry the pipe before the coating is applied, an exhaust pipe 168 is carried from the engine. In this pipe there is a valve 169 so that the exhaust may be discharged through the outlet 170 direction to the air. The pipe 168 is provided with two discharge nozzles 171, diametrically opposite, which blow the exhaust on the pipe inside the line 161 and thus dry the pipe. When it is desired to apply a thin priming or adhesive coat to the pipe prior to the concrete or mastic coating, this is done by means of spray jets 172 from spray pipes 173. These pipes lead to a liquid tank 174, which tank has outwardly extending hooked ends 175 suspended on the two lower side rods 11. A feed pipe 176 leads to the tank and is used for applying pressure to the liquid.

In the operation of the machine so far described, the pipe is dried and the priming coat supplied as above mentioned. The engine operating the gear 69 rotates the ring 61. The complementary grooves and ribs which interengage this ring and the fixed segmental ring 12 act as a bearing for rotation and also as a thrust bearing. The material to be applied as a coating to the pipe is fed through the hopper and is taken by the threads on the conical screw construction, which construction is rotated through the medium of the hinged joints 160. The material is conveyed by the screw toward its apex and is gradually compacted in the fixed structure 93 and the circular segmental collar 86. This gives a cylindrical coating on the pipe. The rubbing shoes 161 on each segmental section of the screw spread the priming coat and rub such coat well into the surface of the pipe, thus giving a good adhesion of such priming coat to the pipe, and in addition, such shoes have a limit contact to lessen the friction on the pipe. The shoes have a slight pitch relative to the pipe, this being in a counter-direction to that of the forward feed of the machine. As the molding material, such as concrete or a hot mastic, is compacted by the screw and the collar 86 exerts a thrust longitudinally of the pipe, the weight of the machine is carried by the dolly carriages.

As above described, the polishing or troweling segmental rings 134 rotate in an opposite direction to that of the screw in order to give a counter-torque and rotate at a much higher speed. These press but slightly on the surface of the finished pipe coating and with the concrete cover bring the water to the surface, and with a hot mastic give this a smooth surface finish. As above mentioned, in both the collar and the polishing segments, either hot or cold air may be blown through these. With concrete this may be with hot air to dry the moisture and with a hot mastic cold air may be used to quickly chill the pipe coating.

In order to maintain sufficient pressure between the driving friction wheel 145 and the driving face 129 of the rotatable segmental ring 126 I employ a pressure collar 177 on the shaft 146 with a compression spring 178 thrusting against the hub 179 of the friction wheel 145. The pressure collar 177 may be adjusted on the shaft to increase or decrease the pressure.

When covering the pipe with concrete and, in some cases, with a mastic composition, it is desirable to also wrap the covering. Such wrapping may be formed of paper and is accomplished by a wrapping appliance designated by the assembly numeral 180 (note Figs. 11 and 12). This wrapping appliance is housed in the fixed ring 15, there being a rotatable segmental ring 181 mounted therein, and there being a ribbon groove 182. The ring 181 carries a gear 183. This is driven by a drive gear 184 on a shaft 185, which shaft may be an extension of the shaft 146. The ring 181 has a stud 186 mounted thereon and extending parallel to the axis of the pipe, and on this stud there is located a spool 187. This spool is designed to have a plurality of paper strips 188 wound thereon. These strips are wound parallel and the outermost strip is illustrated as being unwound at 189, forming a covering 190 on the coating of the pipe. A frictional resistance to the rotation of the spool is by means of a washer 191 on the stud 186 and a compression spring 192 between this washer and the head of the stud. A spacer tube 193 holds the spool spaced from the ring 181 in order to allow a retraction movement of the polishing segments 134. When one of the windings is exhausted from the spool, the second may then be used and the third, etc. The object of forming the spool of considerable length with several parallel windings thereon is on account of the restriction to the diameter of the spool. It is obvious, however, that one or more spools may be mounted on parallel studs on the ring 181 and as the web is exhausted from one spool another may be connected thereto. This covering on a plastic material holds it in close contact with the pipe until it may be set, forming, in effect, a mold for retaining the plastic material, such as concrete, in position.

My machine, while it is designed to move longitudinally of a long pipe, laid on the ground or in the trench, and to make provision for some differences of diameter of pipe and thickness of coating, may also be used in work on fixed-sized pipes of standard length. This would be for using the machine in yard work when the sections of pipe are coated in the yard and taken to the places where they are to be used. In this case the machine may be mounted stationary and the pipe forced through the machine.

It is advisable to have a valve which may regulate the flow of the covering material from the hopper to the screw. This valve, designated 194, is constructed with a dome or spherical lower portion 195 and a conical upper portion 196 suspended by a flexible chain 197 in the apex. (Note Fig. 3.) This valve is seated in the circular valve seat at the bottom of the hopper.

A change in the throat collar 86 and the polishing segments 134 for different thicknesses of coating may be made by retracting the segments used for a standard thickness coating through the medium of the turnbuckle nuts on radial studs and inserting fillers. In Figs. 15 and 16 there is illustrated the manner of inserting fillers for an increased thickness of coating. In this case the various segments of the molding collar or throat 86 are retracted and segmental shoes 198 are inserted. These have joints 199 with abutting flanges 200 fitting in between the space formed by separating the hollow segments. A pair of adjusting screws 201 are attached to each of the segments 198 and extend through perforations in the walls of the segments of the collar 86 and are secured by a nut 202. When using the molding collar or throat 86 contracted a plug is threaded into these openings.

On account of the molding form 93 also being expanded for an increased thickness of the pipe, the fillers have an enlarged extension 203. These are also provided with bolts 204 extending through the wall of the structure 93 secured by nuts 205. These fillers are provided with a cylindrical section 206 and an end flange 207 to bear against the surface 68 of the rotatable ring 61. The flanges 200 of the fillers abut at the open joint at the top of the structure 93. This expansion widens the opening in which the lower hopper 115 fits, but this does not interfere with the feeding of the material through the hopper. A lower hopper, if desired, may be attached to the upper or main hopper. This construction with the fillers widens the conical-shaped structure of the molding form 93. Therefore, it is necessary to move the cone-shaped screw more toward the apex end of this mold 93. This is done by shifting the ribs of the rotatable ring 61 in the grooves 64, moving this whole ring and the screw more toward the discharge end of the screw. This action moves the gear 69 but this is of sufficient width to always mesh with the gear 71.

A similar enlargement may be made in the polishing or surface finishing section 118. In this case the polishing segments 134 are shifted outwardly by manipulation of the turnbuckle on the studs 130 from the position of Fig. 5 to that, for instance, of Fig. 14. Filler sections 208 are inserted, each of which is provided with flanges 209 intermediate the ends of the segments 134. The segments, however, in this case, are illustrated as slightly out of contact with the covering of the pipe. This contact is made by smoothing rods 210 which are welded to the inner surface of the segments 208 and extend diagonally on these segments and have a coarse pitch. When the polishing segments are rotated, these smoothing rods are the only parts which contact with the surface of the coating and give this a smoothing action and a more or less polished surface finish for a hot plastic composition and smooth concrete, bringing the water to the surface. On account of the pitch of these rods, if any water is scraped off it is fed toward the discharge end of the machine, when concrete is used as the pipe coating.

When the machine approaches joints in the pipe, it is necessary to discontinue the application of the coating when the machine has been fed over the flange or coupling to a sufficient extent to interfere with the application of the air drying and application of the priming coat. Therefore, the molding collar of throat 86 and the smoothing segments are opened out or enlarged for the purpose of passing the structural parts over the joint. The means for spreading apart or opening these sections is as follows:

On account of the forward projecting overlap 144 of the segments 134, it is necessary to expand these first. As above described, these segments are connected to the rotatable segmental ring 126 by means of the threaded studs, and this segmental ring is mounted in the bearing ring 123, each segment of this bearing ring being carried by one of the shoes 122, which shoes are slidable on the sloping section 120 and guide structures 119. The arrangement for sliding these outwardly on this guide structure comprises a lever 211 which is pivoted on a bracket 212 secured to the ring 14. This bracket has a handle end 213 and a relatively long section 214. This section is provided with an eye 215 and at the bottom with a slot 216 (note Figs. 1, 2, 5). The lower ends 214 are forked and passed downwardly on opposite sides of the pipe being coated and, preferably, outside of the ring 14. The two side shoes 122 are provided each with a pulling rod 217 which has one section 218 extending through each of the side shoes, a longitudinally extending section 219 parallel to the axis of the pipe, and an end section 220. This end section fits in the slot 215. Both sides are the same. At the bottom a double pulling rod 221 (note Fig. 5) has a central section 222 extending through the shoe 122. There are then two forwardly extending sections 223 and two lateral extensions 224. These lateral extensions fit in the slot 216 at the bottom of the lever 211. The bracket 212 is provided with a ratchet segment 225 which is engaged by a pawl 226 operated by a finger grip end 227, this being the usual type of pawl and ratchet engagement. By this construction by pulling the hand end 213 of the hand lever in a forward direction of the feed of the machine, the lower part of this yoke lever is swung back. This movement pulls the shoes 122 in a rearward direction. The shoe at the bottom, manifestly, may be moved to a greater distance but the slope is sufficient so that the upper shoes are retracted outwardly to a sufficient extent whereby the segments of the polishing structure 118 are moved outwardly to a sufficient extent to allow passage over a joint or coupling of the pipe.

The segments of the molding collar or throat 86 are moved outwardly in a similar manner by the shoes 81 sliding on the sloping section of the guide 76. These are actuated by a similar type of hand lever. This arrangement, therefore, enlarges the molding throat sufficiently for passing over a coupling in the pipe. At the same time the mold form sections 93 are moved outwardly. On account of these sections being shifted radially in an outward direction, the cone having the feed screw may be spread apart. This pivots on its hinges as the machine is pulled forward over a flange. Then when these segments are forced together again they form an overlap, as shown in Fig. 7. The threads, however, are shown as having a butt joint. Should the pipes be of slightly different diameters, there will be a change in the lap joint of the sections of the feeding screw, and the threads of this screw may have a slight opening at the joints. This would be insufficient to cause any trouble in feeding the material.

In Fig. 15 I have illustrated a modified form of feeding screw, this construction being indicated by the assembly numeral 228. This is somewhat a conical construction but the inner walls 229 are formed with a concave curve on the outer side. This causes the end of apex section 230 to be substantially parallel to the surface of the pipe. The screw 231, therefore, in feeding the material causes this material to have a thrust stress substantially longitudinally of the pipe compacting the material firmly in the throat collar and functioning the same as the conical screw for forcing the machine in a forward direction. In this construction the leaves or sections of the screw are hinged as illustrated at 232. This form has a similar overlap and the threads of the screw abutting.

While I have illustrated and described my machine as being adjustable as to size for accommodating differently sized pipes and for different thickness of coatings as well as for installing on a pipe from one side of such pipe, it is obvious that the various parts may be made in fixed sizes and inserted over the end of the pipe. With a fixed sized structure the machine is adapted for work at a plant in which the pipes may be coated and then taken to the work.

In order to effect a feeding of the machine independently of that caused by the pressure on the coating, pulling cables 233 are secured to eyes 234 on the ring 12. A pulling stress by any suitable means is exerted on these cables so that they tend to move the machine in a forward direction. This aids the progression of machine in applying the coating and may also be used to shift the machine over the pipe joints or couplings.

Each of the hinges 160 (Fig. 2) is provided with a spring 160' and the hinges 232 (Fig. 15) have a spring 232', which springs are tensioned to exert a force to contract the segments of the material feeding screws together and the segments are held in engagement with the pipe at the apex end by the pressure of the coating material.

In Figure 18 is illustrated a modified construction of feeding screw suitable for pipes without a flange. In this case the fixed ring 12 forms a bearing for a rotatable ring 240 which has a suitable driving gear connected thereto. A non-adjustable screw 241 has a cylindrical sleeve 242 rigidly attached to or formed integral with the rotatable ring 240 and the screw threads 243 extend outwardly from the sleeve 242. The molding form 244 has a cylindrical part 245 and a tapered or coned section 246. This coned section merges into the throat forming collar 247 which may taper slightly. In this construction there is a small clearance 248 between the pipe and the sleeve 242 of the screw. This construction is designed for a flangeless pipe and the machine may be fitted over the end of the pipe length. In operation each pipe length is coated and the coating polished leaving a few inches at each end uncovered. These lengths are then coupled or welded and a coating molded around the joint in a suitable manner. Reinforcement wires 249 may be prewound on the pipe and pass through the clearance space 242. Similar reinforcements may be placed on the pipe of Figures 2 and 15, the shoes 161 either riding over such reinforcement or, when of coiled wire, following the pitch of the wire as the pipe and screw advance one relative to the other. The surface finishing segments of the surfacing device 118 may be adjusted with tight or loose fit or at slightly different radii from the axis of the pipe and in such latter case give a slight vibration to the coating. This vibration is of advantage with moist concrete coating of compacting such coating. The hopper may be vibrated by any known means to aid feeding of the coating material therethrough.

The wrapping portion of the machine illustrated in Figures 11 and 12 is shown as applying a strip or web like covering which may be paper, fabric, metal strips, or woven wire, but it is desired to cover the use of wires or spaced bands wound on the outside of the mastic or concrete pipe coating.

It will be apparent that the machine may be stationary and lengths of pipe fed therethrough so that a coating may be formed on the pipe. The action of depositing the coating on the movable pipe may be used to feed the pipe through the machine. The pipe lengths with the coating thereon may then be removed from the machine and the coating allowed to harden on the pipe.

Various changes may be made in the details of construction without departing from the spirit or scope of the invention as defined by the appended claims.

I claim:

1. In a pipe coating machine, a molding form having a section tapered from a large to a smaller diameter and merging at its smaller diameter into a contracted collar forming a molding throat adapted to surround a pipe and forming an annular space therewith, means to discharge a coating composition into the molding form, a rotatable screw located partly in the molding form and feeding the material through the molding form into the collar forming the throat, means to inject a priming coat between the screw and the pipe onto the pipe, and rubbing elements on the screw to spread said priming coating.

2. In a pipe coating machine as claimed in claim 1, a wrapping device having an element rotatable around the coating on the pipe and provided with a spool, said spool having a wrapping material thereon, the wrapping material being applied in a helical manner on the coating.

3. A machine for coating pipe comprising in combination a molding form tapered from a larger to a smaller diameter and merging at the smaller diameter into a collar forming a throat, the molding form and throat adapted to surround a pipe and form an annular space therebetween, means to discharge a coating material into the molding form, means to compress the material longitudinally of the pipe and to compact said material in the annular throat, a surface polishing means having rotatable devices rotating in a circular manner around the coating and giving a surface finish thereto, and a wrapping device rotatable around the pipe and coating and having a spool with wrapping material thereon, the said wrapping material being wound helically on the coating.

4. A machine for coating pipe comprising in combination a longitudinal frame having a series of rings secured thereto, the rings being adapted to encircle a pipe to be coated, one ring having a collar mounted therein to form a molding throat, a molding form connected to the throat and enlarging in diameter lengthwise of the pipe, means to discharge coating material into the molding form, a second ring having a rotatable ring mounted therein with a feed screw connected thereto, the feed screw operating partly in the molding form and feeding the coating material into the collar forming the throat.

5. A machine for coating pipe as claimed in claim 4, a third ring having a plurality of surface finishing segments radially adjustable therein, said segments having a surface bearing on the outside of the coating, a power engine mounted on the frame and having a drive connected to rotate the screw in one direction and the segments in an opposite direction.

6. A machine for coating pipe comprising in combination a fixed framework comprising a plurality of longitudinal rods connected by a series of circular jointed rings, said rings having gates therein for inserting sideways over a pipe, a collar formed of segments radially mounted in one of the rings and forming a molding throat, a molding form having sections secured to the segments of the throat, another ring having a rotatable ring mounted therein with a screw formed of tilting sections, the sections being adapted to encircle a pipe and to pass over a flange on the pipe, means to slide the segments of the throat outwardly to pass over a pipe flange.

7. A machine for coating pipe as claimed in claim 6, the segments of the throat being combined with filler pieces inserted therein for increasing the thickness of the coating on the pipe.

8. In a machine for coating pipe, a surface polishing appliance comprising radially adjustable segments, means to connect said segments together, and means to rotate said segments in a circular manner around a coating on the pipe.

9. In a machine for coating pipe as claimed in claim 8, the said surface segments having smoothing rods positioned at an angle to the axis of the pipe coating and adapted to engage the surface of the coating.

10. In the method of coating pipe comprising spraying a priming coat on the exterior of a pipe, rubbing and spreading the priming coat over the pipe, then compressing an annular mass of coating material in a direction longitudinally of the pipe and at the same time contracting the diameter of said material until the material contacts with the pipe, and then pressing the material in a direction longitudinal to the surface of the pipe to form a compact annular coating on the pipe, said coating adhering to the priming coat on the pipe.

11. A machine for coating pipe comprising in combination a longitudinal frame, a plurality of dolly carriages at the forward end of the frame, each having a wheel adapted to engage the top and two wheels the opposite sides of the pipe, means to support the other end of the frame on a coating applied to the pipe, and means to simultaneously retract all of the wheels of each dolly carriage to pass over a flange on the pipe, and means in the frame for applying a coating to the pipe.

12. A machine for coating pipe as claimed in claim 11, each of the dolly carriages being slidable longitudinally on the frame, and means to simultaneously retract the wheels of each carriage to clear a flange, the dolly carriage being shiftable forwardly on the frame when the wheels are so retracted.

13. In the method of coating pipe, the step of applying a primary coating to the pipe longitudinally thereof and by a circumferential rubbing action spreading said coating circumferentially and working it into close contact with the pipe.

14. In a machine for coating pipe, an inner conical-shaped structure surrounding the pipe and having rubbing shoes adjacent its apex in contact with the pipe, means to apply a primary coating to the pipe longitudinally thereof, and means to relatively rotate the pipe and said structure whereby the rubbing shoes exert a circumferentially rubbing action on the coating and develop a close adherence of the coating on the pipe.

15. In a machine for coating pipe as claimed in claim 14, a conical molding form exterior to said inner conical structure, a collar forming a cylindrical throat exterior to the pipe, means to feed, work, and thrust a coating composition made of aggregates and a binder of the Portland cement type between the inner structure and said molding form toward said throat, and said means to feed, work and thrust the coating effecting a relative longitudinal movement of the pipe, said inner structure, molding form and collar, whereby the coating at the throat remains stationary as to the pipe and adheres thereto.

16. In a machine for coating pipe, an inner conical structure surrounding a pipe, an outside molding form having a collar at one end forming a throat between the collar and the pipe, means between the inner structure and the molding form to feed, work, and thrust a coating composition made of aggregates and a binder of the Portland cement type into said throat, said feeding means effecting a relative longitudinal movement of said inner structure, the molding form, the collar and the pipe, whereby the composition in the throat remains stationary as to the pipe and adheres thereto, rubbing shoes adjacent the apex of the inner structure to contact with the pipe, and means to rotate said inner structure and shoes relative to the pipe.

17. In a machine for coating pipe, a molding form merging into a collar forming a throat adapted to surround a pipe, means to feed a self-hardening coating material through the molding form into the collar, means to press the coating material into the collar forming the throat longitudinally of the pipe, a polishing device comprising surface finishing elements spaced around the coating, and means to rotate said elements in a circular direction and in contact with the surface of the coating.

18. In a machine for coating pipe, a molding form tapered from a large to a small diameter and merging into a collar forming a throat surrounding a pipe forming an annular molding space, means to discharge coating composition into the molding form, means to exert a longitudinal thrust on the material in the molding form and force same into the collar forming the throat, said means exerting a thrust longitudinal of the pipe and compacting the material in the throat against the pipe to form a coating on the pipe, said packing action being adapted to relatively move the pipe and the machine, whereby the coating remains stationary relative to the coated pipe and adheres thereto, a surface finishing appliance comprising a plurality of arcuate segments connected together and surrounding the coating having a surface bearing thereon, and means to rotate said segments in a circular direction around the coating.

19. In a machine for coating pipe, a molding form tapered from a large to a smaller diameter and merging at the smaller diameter into a collar forming a throat adapted to surround a pipe and form an annular space between the pipe and the collar, means to discharge a coating composition into the molding form, a rotatable screw in the molding form adapted to surround the pipe, said screw forcing the material longitudinally of the axis of the pipe and into the throat formed by the collar, and at the same time moving the screw, molding form and collar longitudinally of the pipe whereby the coating composition, after being forced through the said throat, is stationary as to the pipe and adheres thereto, a surface finishing appliance comprising a plurality of radially adjustable segments surrounding the coating and connected together, means to rotate the screw in one direction, and means to rotate the segments in an opposite direction, the said segments having a surface finishing bearing on the coating.

20. In a machine for coating pipe, a molding form tapered from a large to a smaller diameter and merging at the smaller diameter into a collar forming a throat adapted to surround a pipe and form an annular space between the pipe and the collar, means to discharge a coating composition into the molding form, a rotatable screw in the molding form adapted to surround the pipe, said screw forcing the material longitudinally of the axis of the pipe and into the throat formed by the collar, and at the same time moving the screw, molding form and collar longitudinally of the pipe, whereby the coating composition, after being forced through the said throat is stationary as to the pipe and adheres thereto, means to inject a priming coat on the pipe, said priming coat applying means being positioned partly under and discharging the coating under the screw.

21. A machine for coating pipe, comprising in combination a molding form tapered from a larger to a smaller diameter and merging at the smaller diameter into a collar forming a throat, the molding form and throat adapted to surround a pipe and form an annular space therebetween, means to discharge a coating material into the molding form, means to compress the material longitudinally of the pipe and to compact said material in the annular throat, and a wrapping device rotatable around the pipe and coating and having a spool with wrapping material thereon, the said wrapping material being wound helically on the coating.

22. In a pipe coating machine, an inner molding form and an outer molding form, the outer molding form terminating in a collar forming a throat, the molding forms and the collar being adapted to surround a pipe, means to work a self-hardening composition between the molding forms towards the collar and to compact the composition in the throat formed between the collar and the pipe at the same rate that the coating is advanced on the pipe, whereby the coating remains stationary to the pipe and adheres thereto, a wrapping device having an element rotatable around the coating on the pipe adapted to supply wrapping material, the said wrapping material being applied in a helical manner on the outside of the coating.

23. A machine for coating pipe comprising in combination a machine frame, an outer hollow molding form, a collar at the discharge end of such form, the form and collar being stationary relative to the frame, the frame having an opening therethrough for a pipe to be coated whereby such pipe extends through the frame, the form and the collar and beyond both ends of the frame, the collar being adapted to form with the pipe an annular throat, a coating working means positioned within the said form and adapted to surround the pipe, means to move said working means relative to the frame to work and positively press a self-hardening cementitious coating material longitudinally of the pipe, the form and into the collar, the said material working means being adapted with the molding form and the collar to compact the coating material on the surface of the pipe at such a rate to advance the machine frame, the molding form and collar longitudinally of the pipe at the same rate as the deposition of the coating on the pipe whereby the coating remains stationary as to the pipe and adheres to the pipe and means to guide the frame relative to the uncoated and coated portion of the pipe whereby the coated portion remains concentric to the axis of the portion of the pipe within the machine frame.

24. A machine for coating pipe as claimed in claim 23, a rotatable sleeve positioned inside of the molding form and having rubbing shoes in contact with the pipe adjacent the collar, the said sleeve leaving a space between the sleeve and the pipe, the said rubbing shoes being adapted to prevent back-flow of the coating into the said space.

25. A machine for coating pipe as claimed in claim 23, the molding form being contracted towards the collar, its small end being connected to the collar, a rotatable conical sleeve inside of the molding form having rubbing shoes adjacent the throat to rub on the pipe, the said sleeve forming a space surrounding the pipe except for contact of the shoes, the said shoes being adapted to prevent back-flow of the composition along the pipe into the said space.

26. A machine for coating pipe as claimed in claim 23, the molding form being tapered towards the collar and connected thereto at the small end of said form, a rotatable sleeve surrounding the pipe and having a rubbing portion adjacent the throat in rubbing contact with the pipe, the material working means being secured to the sleeve and rotating therewith, there being a space between the sleeve and the pipe except for the contact end portion, the said contact end of the sleeve being adapted to prevent back-flow of the composition along the pipe into the said space.

27. A machine for coating pipe as claimed in claim 23, the means to guide the frame comprising rollers connected to the leading end of the frame, said rollers being adapted to engage the uncoated portion of the pipe and means located beyond the throat to contact the coating on the pipe.

28. A pipe coating machine comprising in combination a machine frame having an outer hollow molding form, a collar connected to said form, the said form and collar being stationary relative to the frame, a rotatable sleeve, the said frame having an opening completely therethrough whereby a pipe having reinforcing material thereon may extend through the frame including the sleeve, the molding form and collar, and the pipe with the reinforcing extends beyond opposite ends of the frame, the said collar forming an annular throat with the pipe to give a finished thickness to a coating, a movable working means located between the sleeve and the molding form to positively work a self-hardening cementitious coating material longitudinally of the pipe, the molding form and into the collar to compact the material into the collar to embed the reinforcing in the collar, the said sleeve forming with the pipe an annular space to accommodate the reinforcing, the said reinforcing being adapted to prevent back-flow of the composition into the said space, and means to guide and center the machine frame relative to the uncoated and coated pipe whereby the coated portion of the pipe remains concentric to the axis of the portion of the pipe within the frame, the said material working means being adapted to form a relative advancement of the machine and the coated pipe at the same rate as the deposition and setting of the coating material on the pipe.

29. A pipe cutting machine as claimed in claim 28, the said sleeve being cylindrical on the surface adjacent the pipe, the material working means being connected to the sleeve and thus rotating therewith.

30. In the method of coating pipe with a self-hardening cementitious composition comprising working and pressing a relatively thick annular body of the coating composition in a direction longitudinally of the surface of the pipe to be coated by pressures applied mainly from the portion of the body remote from the place of adherence to the pipe, contracting said annular body in diameter and reducing its thickness by inward radial pressures substantially evenly distributed around the coating and the pipe and compacting the reduced annular body on the surface of the pipe, advancing the coating and the pipe at the same speed whereby the applied coating remains stationary as to the pipe and adheres to the pipe, and maintaining the coating of substantially uniform thickness on the pipe as well as maintaining the coated pipe concentric with the axis of the uncoated pipe.

31. In the method of coating pipe as claimed in claim 30, in the working and pressing of the relatively large annular body, maintaining said body spaced from the pipe and preventing a backflow of the portion of the annular body of reduced diameter into the said space.

32. In the method of coating pipe as claimed in claim 30, in the working and pressing of the relatively thick annular body, maintaining such body spaced from the pipe, developing a circular rubbing action on the pipe substantially immediately preceding the place of contracting the diameter of the annular body and at the same time preventing backflow of the coating composition into the said space.

33. In the method of coating a pipe having a wrapping of reinforcing material on its outer surface with a self-hardening cementitious composition comprising working and pressing a relatively thick annular body of the coating composition in a direction longitudinally of the surface of the pipe while maintaining such body spaced from the pipe and the reinforcing, the said pressure being applied mainly from a position remote from the place of contact of the coating on the pipe, reducing the diameter and also the thickness of the coating while maintaining the longitudinal pressure to embed the reinforcing in the coating and apply the coating to the pipe by radial pressures substantially uniformly distributed around the pipe, advancing the coating applied to the pipe and the reinforcing at the same speed as the movement of the pipe whereby the coating remains stationary as to the pipe and the reinforcing embedded therein, and causing the coating to adhere to the pipe and to the reinforcing.

34. In the method of coating a pipe as claimed in claim 33, limiting the annular space between the relatively large annular body and the pipe to accommodate only substantially the reinforcing wrapping, causing such wrapping in the space to prevent backflow of the composition into the said space.

35. In the method of coating a pipe as claimed in claim 33, after the first contact of the coating with the pipe still further reducing the thickness of the coating and hence the outside diameter of the coated pipe.

THOMAS H. WILSON.